UNITED STATES PATENT OFFICE.

EDMUND HENRY BECKER, OF WASHINGTON, DISTRICT OF COLUMBIA, ASSIGNOR TO KINETIC ELECTRIC COMPANY, OF NORFOLK, VIRGINIA, A CORPORATION OF VIRGINIA.

MANUFACTURE OF ELECTRODES.

1,228,169.          Specification of Letters Patent.      Patented May 29, 1917.

No Drawing.     Application filed September 27, 1916. Serial No. 122,563.

*To all whom it may concern:*

Be it known that I, EDMUND HENRY BECKER, a citizen of the United States, residing at Washington, in the District of Columbia, have invented certain new and useful Improvements in the Manufacture of Electrodes, of which the following is a specification.

This invention relates to the manufacture of electrodes; and it comprises hard, resistant, mechanically strong plates, rods and the like, composed of a granular copper oxid material, the granules consisting of an intimate and homogeneous mixture or combination of cupric oxid and cuprous oxid, the granules in the bodies being in mechanically interlocking mutual relation and being united by a sintered union at their meeting faces; and it further comprises a method of making such bodies wherein a suitable copper oxid material in granular form is converted into a slurry or paste or thick flowable condition with the aid of water containing a dissolved temporary binder, the mixture being produced in or delivered into a mold of suitable shape wherein it is agitated by shaking or the like to an extent sufficient to cause a relative motion of the granules among each other which will produce a mechanical interlocking, the agitation being continued until a more or less coherent deposit has formed in the mold, the separated liquid is withdrawn and, if desired, a small amount of water added to remove further amounts of the temporary binder with continuance of the agitation, the separated cake or molded body dried and the dry cake or molded body heated to a temperature sufficient to cause sintering between meeting faces of the granules in the cake or molded body without producing fusion thereof, such heating if desired being under such circumstances as will reconvert the contained cuprous oxid into cupric oxid; all as more fully hereinafter set forth and as claimed.

In primary and secondary cells of the alkaline type, a common type of negative electrode is copper oxid molded or cemented into form. It is somewhat difficult, owing in part to the low electrical conductivity of copper oxid, to produce thoroughly satisfactory negative electrodes of this material. The copper oxid in granular form is sometimes used loose in a cage of copper netting or the like but more frequently it is pressed into more or less hard and resistant bodies. It is however difficult to cause any good mechanical union between the copper oxid granules in the usual methods of operation without employing a binder of some description, such as various chlorid salts, carbon, silicate of soda, etc., and these binders in the finished electrode are more or less disadvantageous since they form layers or films of different electrical properties separating the copper oxid granules. The copper oxid used is ordinarily the black oxid of copper or cupric oxid. A much more advantageous type of copper oxid for electrode purposes is an intimate and homogeneous mixture of cupric and cuprous oxids (see patent to Wirt Tassin, No. 1,129,818, granted February 23, 1913). Such a material has better electrical properties than the black oxid. Electrodes may be made from it by fusion and casting which are of highly desirable type. It may also be produced in granular form. It is granules of this type of copper oxid which I advantageously employ in the present invention, although granules of other types may be employed.

As stated, a common way of making copper oxid electrodes is to press the granulated material into form, usually employing a binder as well. In so doing, obviously no very intimate contact between the several granules in the final material is attained; the granules are at most, more or less, in contact, so to speak, point to point. Actually, the binder interferes more or less with conductivity even at these points. This is bad for electrical reasons since, as stated, the electrical conductivity of the copper oxids is not great. And the presence of a large amount of binder, or indeed of any substantial amount of binder accentuates the difficulties.

I have found that I can produce a type of copper oxid electrode from granulated oxid which is much more advantageous by the use of certain expedients. I have found that if instead of directly shaping a mass or body of the copper oxid particles or granules into form by high pressure in the presence of a binder, I shake a mass consisting of copper oxid granules and a watery lubricating fluid in a mold, the relative movements of the granules causes them to pack together in, so to speak, interlocking form; producing a cake or body in which there is a minimum of voids; the particles of copper oxid fitting together with the maximum of possible contact. In so doing the granules meet face to face instead of merely point (or corner) to point. So great is this effect, I have found, that by simply shaking fine ground copper oxid with water for a time I can produce a cake or consolidated sediment which has a considerable degree of mechanical strength;
enough mechanical strength to allow it to be handled. But I have found it is better to use a small amount of certain materials in the water; materials which may be termed "temporary binders" although as a matter of fact their function is more that of changing the physical relations between the water and the suspended solids than that of any actual binding. As this temporary binder I ordinarily employ a dilute solution of caustic soda, such a solution, for example, as may be made by mixing one part of caustic soda lye of 29° Bé. (22.5 per cent.) with six parts of water, although any other material capable of producing what are known as "suspensions" may be used.

While I may use any type of copper oxid, I find it most advantageous to use the intimate and homogeneous mixture or combination of the two copper oxids described in said Tassin Patent No. 1,129,818. I can however make excellent electrodes from ordinary copper scale which contains more or less cuprous oxid, together with cupric oxid. When using this hammer scale I ordinarily first fine grind in order to make the mixture of the two oxids it contains as uniform and homogeneous as possible. I can however within the limits of the present invention use cupric oxid, the ordinary black oxid of copper. But I find that I can produce a better electrode by using either the described Tassin product or copper scale. These materials give a better mechanical union of the granules in the present process. Where a black oxid electrode is required it is better to use the mixed oxids to make the electrode and after shaping oxidize to convert the cuprous oxid into cupric oxid.
The copper oxid employed is best ground to about 100 mesh, although for special purposes finer material or coarser material may be employed.

In a specific embodiment of the described process, I take a copper oxid containing both cupric and cuprous oxid such as the Tassin oxid or hammer scale and fine grind it to about 100 mesh. I then make a medium or vehicle using a solution of weak caustic soda, say, about a 4 per cent. solution, which may conveniently be done by mingling one part of the usual caustic soda electrolyte of 29° Bé. with six parts of water. I mingle the fine ground copper oxid with this vehicle in such an amount as will give the mixture a molasses-like consistency; as will make it what may be described as a slurry. The amount of the vehicle necessary for this depends somewhat upon the fineness of the copper oxid; but with 100 mesh, fine ground copper scale I find that about one part by weight of said vehicle to six parts by weight of the oxid makes a mixture having good properties. I advantageously continue the mixing for at least five minutes. The mixture or slurry is usually next poured into a mold of suitable form though the mixing may be done in the mold itself. An iron or tin mold coated with paraffin may be employed. The mold with its contents is next placed on a suitable jolting or vibrating device and submitted to a jolting or vibrating action for 15 minutes or so. The time necessary depends largely upon the type of mechanism employed.
But in a general way I jolt or vibrate long enough to cause a clean separation between the deposited cake or body of copper oxid filling the mold and an upper layer of clear liquid. The longer the jolting or vibration the better is the interlocking action between the copper granules and the better will be the electrical contact in the final product; i. e., the better will be the electrode. As stated, I desire to produce a more intimate contact than that existing in the usual compressed electrode. When the jolting or vibration is sufficient, the cake of wet material in the mold will have a considerable degree of mechanical strength as it is. I ordinarily next remove the clear separated liquid, which may be used again with more copper oxid, and add a little clear water and continue the vibration or jolting. This water serves to remove any excess of caustic soda there may be in the mass, and for this and other reasons the addition gives a somewhat better product. It is not desirable to have foreign matters (even caustic soda) present to any substantial extent in the finished electrode and there is also less danger of warping in a subsequent baking operation if this treatment with water be given. The water is next removed and the cake, which can now be handled if necessary, is next dried. I find it advantageous to leave it in the mold and to dry mold and all at a low temperature. If the mold has been coated with paraffin, the temperature of drying should be below the melting point of the paraffin used; say, below 100 to 105° F. After the molded body is dried for a period of time it is lifted out of the mold and dried further, which may be done at a somewhat higher temperature, say, 150 to 200° F. After the drying has been carried to the stage desired, the molded body is next given a quick exposure to a high temperature; a temperature of about 1800° F. being suitable for electrodes made of the described Tassin oxid or copper scale. For small sizes, about 10 minutes' heating suffices. The result of this heating is to shrink the oxid plate somewhat and render it hard, compact and resistant without making it absolutely non-porous. A certain degree of perviousness is desirable in these electrodes; enough porosity to allow liquids to penetrate without militating too much against the electrical conductivity. I can produce various changes in the character of the finished product by variations in this heating treatment. If for instance, in making a flat plate electrode I cut down the time of exposure to a high heat, the edges of the plate have a compacter texture than the center so that I have the effect of a more porous central area on the plate surrounded and held by a less porous and stronger rim or edge. But ordinarily I compact the electrode throughout its body by about 10 minutes' heating. The effect of this heating is to sinter the meeting faces of the copper oxid particles and cause a good electrical and mechanical union therebetween. In this sintering the slight amount of caustic soda still left in the electrode probably contributes by union with the $Cu_2O$. I do not, in this invention, carry the temperature of the final baking high enough to produce fusion; say as high 1925° F. I merely wish to have enough heat to produce the described sintering union.

About 10 minutes' baking is suitable for elements of ⅛th of an inch thick. If the thickness be more, say ¼th inch, the time should be increased to say 20 to 30 minutes.

If an electrode of black oxid is desired, heating may be continued at a lower temperature, say 800° to 1200° F., in the presence of air. Presence of a little steam in the air is advantageous. This oxidizes the cuprous to cupric oxid without destroying the bond.

In order to produce a certain degree of porosity of the finished electrode, which is desirable as allowing penetration of the electrolyte, without interfering with the mechanical and electrical bond between the particles of oxid, it is better to use material of a uniform granule size. For example, material passing a 90-mesh sieve but retained by a 100-mesh sieve may be employed. Material passing a 100-mesh sieve may also be employed. Either will give a better electrode than a mixture of the two. A mixture of the two gives a less porous electrode than either singly; and, further, a mixture of particles of two grades of fineness tends to separate somewhat, but irregularly, in the described jolting operation. The described granule sizes are merely exemplificatory; good electrodes may be made with granules passing a 60-mesh sieve but retained by a 70-mesh sieve or with materials passing a 120-mesh sieve and retained by a 130-mesh sieve.

What I claim is:—

1. A copper oxid electrode for electric cells composed of granules of copper oxid material in mechanically interlocked mutual relative position.

2. A copper oxid electrode for electric cells composed of granules of copper oxid material in mechanically interlocked mutual relative position and united by a sintered union at their meeting faces.

3. The process of making negative electrodes which comprises forming a slurry of a fine ground copper oxid material with water, vibrating such slurry in a mold until said copper oxid material forms a compact body with the particles in interlocking relation and separating the clear liquid from the body so produced.

4. The process of making negative electrodes which comprises forming a slurry of a fine ground copper oxid material with water containing a small amount of temporary binder, vibrating such slurry in a mold until said copper oxid material forms a compact body with the particles in interlocking relation and separating the clear liquid from the body so produced.

5. The process of making negative electrodes which comprises forming a slurry of a fine ground copper oxid material with water containing a small amount of temporary binder, vibrating such slurry in a mold until said copper oxid material forms a compact body with the particles in interlocking relation, separating the clear liquid from the body so produced, adding a little water and continuing the vibration.

6. The process of making negative electrodes which comprises forming a slurry of a fine ground copper oxid material with water containing a small amount of temporary binder, vibrating such slurry in a mold until said copper oxid material forms a compact body with the particles in interlocking relation, separating the clear liquid from the body so produced, and baking said body to produce a sintered union between the meeting faces of the copper granules.

7. The process of making negative electrodes which comprises forming a slurry of a fine ground copper oxid material with water containing a small amount of temporary binder, vibrating such slurry in a mold until said copper oxid material forms a compact body with the particles in interlocking relation, separating the clear liquid from the body so produced, agitating with a portion of water and finally baking the body so produced at a temperature sufficiently high to cause a sintering union between the meeting faces of the granules in said body.

In testimony whereof, I affix my signature.

EDMUND HENRY BECKER.